Patented June 2, 1931

1,807,642

UNITED STATES PATENT OFFICE

CHARLES S. VADNER, OF RENO, NEVADA

PROCESS FOR RECOVERY OF MANGANESE

No Drawing.   Application filed June 25, 1928.   Serial No. 288,292.

The objects of my invention are to treat low-grade manganese ores and to treat same by means of a cheap acid such as sulphur dioxide gas in the presence of moisture, also to recover the manganese contained in said ores in the form of a valuable by-product. Oxides, carbonates, or sufficiently roasted sulphide ores are ground to the proper size and showered or sprayed in water down through the first of a series of solution towers. These towers are of a suitable size and height according to the quality and quantity of the ore being treated. Tanks singly or in series may be used. The sulphurous fumes are suitably led into these solution towers or tanks and therein mingled with the sprayed or agitated ore pulp. This spraying and mingling of the ore pulp has the effect of subjecting every particle of the ore pulp, in the presence of water, to the solvent action of the sulphurous fumes and resulting in the solution of the manganese together with some of the iron and other metals that may be contained in said manganese ore. The density of the manganese solution is kept below the point where manganese salts, basic and otherwise are easily precipitated out. The insoluble residue is eliminated and washed free from the manganese solution which in turn is freed from excess of sulphur dioxide gas, this is effected by air as well as by heat. The action of sulphur dioxide gas on manganese ore is in most cases sufficiently exothermic that some advantage may accrue therefrom, at various stages of the operations. The pregnant manganese solution may also be freed of excess sulphur dioxide gas by passage over an excess of manganese ore with the aid of heat and air, singly or in conjunction with one another. The temperature at which the reaction between sulphur dioxide and manganese ore is effected, plays an important role as regards the completion of the reaction, but in practical operation the resulting solution from the above reaction is a mixture of manganese sulphate and manganese dithionate, which in a series of complex interactions, due to the various oxide compounds of manganese found in commercial ores, may be expressed as follows:

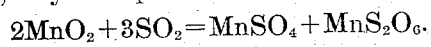

$$2MnO_2 + 3SO_2 = MnSO_4 + MnS_2O_6.$$

This solution is separated from the insoluble matrix and excess sulphur dioxide as above described, iron and other objectionable metallic impurities are eliminated by its treatment with and passage over additional manganese ore.

It is well understood that this treatment may be effected in the presence of heat, cold and additional sulphur dioxide gas and by the use of an excess of manganese ore in the original operations as well as after the complex manganese solution is separated from the ore. Finely pulverized lime rocks may be used in some cases. The purified manganese solution is reduced by evaporation to a dry mass and the temperature gradually raised to 180°–200° C. gently stirring will benefit the operation and manganese salts other than the sulphate but including the dithionates will be decomposed, the sulphur dioxide passing off and in cyclic operation being reused in suitable apparatus in the further treatment of mineral matter and the like containing manganese.

In reducing the manganese solution to a solid state the solid mass is removed as fast as formed and suitably drained and then heated to the above stated temperature in suitable apparatus in which said temperature may be increased gradually to 280°–300° C. or to such higher temperature as may be necessary to reduce the moisture contents of the resulting manganese sulphate to one molecule of water, but in no case should the heat be raised to 450° C. as otherwise the last molecule of water will be expelled.

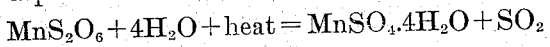

$$MnS_2O_6 + 4H_2O + heat = MnSO_4.4H_2O + SO_2$$

and

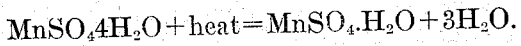

$$MnSO_4.4H_2O + heat = MnSO_4.H_2O + 3H_2O.$$

Having described my invention, what I desire to secure by Letters Patent is:—

1. In producing a mixed solution of manganese sulphate and dithionate from complex manganese ores by means of water and sulphurous gas substantially as described, the step of purifying said solution by passing same over additional manganese mineral matter with air whereby iron is precipitated and eliminated from said solution together with lime, arsenic, phosphorus and other undesirable metals.

2. The process of treating naturally oxidized or sufficiently roasted mineral matter and the like of the nature of complex ores containing manganese which consists in subjecting said finely ground ores to the action of an excess of sulphurous acid gas in the presence of water, separating the insoluble matter from the pregnant manganese solution passing same over additional manganese mineral matter whereby iron, lime, and other deleterious substances and excess of sulphurous fumes are eliminated, separating the precipitated and insoluble matter and recovering the manganese sulphate and manganese dithionate solution, reducing said resulting mixed solution to a dry mass, heating said dry mass gradually to a temperature sufficient to break down the manganese dithionate, converting same to manganese sulphate, passing on the eliminated sulphur dioxide gas for reuse and recovering the manganese sulphate, substantially as described.

3. The process of treating naturally oxidized or sufficiently roasted mineral matter and the like of the nature of complex ores containing manganese which consists in subjecting said finely ground ores to the action of an excess of sulphurous acid gas in the presence of water, separating the insoluble matter from the pregnant manganese solution, passing same over additional manganese mineral matter whereby iron, lime, and other deleterious substances and excess of sulphurous fumes are eliminated, separating the precipitated and insoluble matter and recovering the manganese sulphate and manganese dithionate solution, reducing the said manganese sulphate and dithionate to a dry mass, suitably exposing said dry mass to a temperature gradually varying from 180° to 200° C., sulphur dioxide being expelled and manganese dithionate converted to manganese sulphate, further heating the converted mass of manganese sulphate to a temperature of 300° C. to 350° C. and thereabout sufficient to eliminate the water of crystallization excepting one molecule, passing on the eliminated sulphur dioxide gas and water for further use in cyclic operations and recovering the manganese sulphate, substantially as described.

4. In the art of treating oxidized or roasted mineral matter and the like containing manganese and other metals consisting in subjecting said ore matter to the action of a sufficient quantity of sulphur dioxide gas and water to dissolve out the manganese, together with some iron and other metals, passing the pregnant manganese solution over additional manganese mineral matter and the like precipitating iron, lime and other deleterious substances and taking up the excess acidity of said solution, eliminating the insoluble matter, reducing the resulting solution of manganese dithionate and sulphate formed to a solid state removing out the solid particles as fast as formed, suitably heating same to a temperature gradually rising up to 200° C., sulphur dioxide being eliminated, the dithionate of manganese becoming sulphate of manganese, increasing the temperature to 300° C. and thereabout to eliminate the water of crystallization of the remaining manganese sulphate but maintaining the temperature sufficiently below 450° C. to retain one molecule of water of crystallization to said manganese sulphate and recovering said manganese sulphate substantially as described.

In witness whereof, I have hereunto set my hand.

CHARLES S. VADNER.